(12) United States Patent
Wiedmann et al.

(10) Patent No.: US 9,360,061 B2
(45) Date of Patent: Jun. 7, 2016

(54) PRIME MOVER ARRANGEMENT COMPRISING A FLUID-ACTUATED CLUTCH ARRANGEMENT AND A FREEWHEEL

(71) Applicant: Robert Bosch GmbH, Stuttgart (DE)

(72) Inventors: Felix Wiedmann, Stuttgart (DE);
Andreas Wengert, Backnang (DE);
Nadja Eisenmenger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/385,356

(22) PCT Filed: Mar. 19, 2013

(86) PCT No.: PCT/EP2013/055684
§ 371 (c)(1),
(2) Date: Sep. 15, 2014

(87) PCT Pub. No.: WO2013/139786
PCT Pub. Date: Sep. 26, 2013

(65) Prior Publication Data
US 2015/0075942 A1    Mar. 19, 2015

(30) Foreign Application Priority Data
Mar. 20, 2012 (DE) .......................... 10 2012 204 368

(51) Int. Cl.
*F16D 47/04* (2006.01)
*F16D 25/08* (2006.01)
*F16D 41/04* (2006.01)
*F02B 73/00* (2006.01)
*F16D 25/0635* (2006.01)
(Continued)

(52) U.S. Cl.
CPC ............... *F16D 47/04* (2013.01); *F02B 73/00* (2013.01); *F02G 5/02* (2013.01); *F16D 25/0635* (2013.01); *F16D 25/082* (2013.01); *F16D 25/083* (2013.01); *F16D 41/00* (2013.01); *F16D 41/04* (2013.01); *Y02T 10/166* (2013.01)

(58) Field of Classification Search
CPC .................. F16D 47/04; F16D 41/04
See application file for complete search history.

(56) References Cited

U.S. PATENT DOCUMENTS 2,962,142 A * 11/1960 Straub ..................... F16D 27/02
 192/18 B
4,007,594 A * 2/1977 Elsea, Jr. ................. F01K 23/14
 192/223
(Continued)

FOREIGN PATENT DOCUMENTS

DE   3148208   6/1983
DE   4318475   12/1993
(Continued)

OTHER PUBLICATIONS

International Search Report for Application No. PCT/EP2013/055684 dated Jul. 30, 2013 (English Translation, 2 pages).

*Primary Examiner* — Richard Lorence
(74) *Attorney, Agent, or Firm* — Michael Best & Friedrich LLP

(57) ABSTRACT

The invention relates to a prime mover arrangement comprising an internal combustion engine (1) for driving a first shaft (2) and comprising a steam engine (4), which is connected to the first shaft by means of a clutch arrangement (3), for driving a second shaft (5). Furthermore, a freewheel (6) which interacts with the clutch arrangement (3) is arranged between the first shaft (2) and the second shaft (5) in order to transmit a rotational movement of the second shaft (5) to the first shaft (2) in a first operating mode and to allow the first shaft (2) to freewheel relative to the second shaft (5) in a second operating mode. The clutch arrangement (3) is designed as a fluid-actuated clutch arrangement (3) which can be operated with positive pressure or negative pressure and bridges the freewheel (6) in a friction-fitted or form-fitted manner in order to transmit the rotational movement of the internal combustion engine (1) to the second shaft (5) via a flange (7) arranged on the first shaft (2).

11 Claims, 2 Drawing Sheets

(51) Int. Cl.
*F02G 5/02* (2006.01)
*F16D 41/00* (2006.01)

(56) References Cited

U.S. PATENT DOCUMENTS 6,688,442 B2 2/2004 Nojiri et al.
9,080,658 B2 * 7/2015 Eisenmenger .......... F16D 27/11

2013/0174693 A1 7/2013 Eisenmenger et al.

FOREIGN PATENT DOCUMENTS

| DE | 102009047766 | 6/2011 |
| DE | 102010054336 | 8/2011 |
| EP | 311285 | 4/1989 |
| WO | 2011124193 | 10/2011 |
| WO | 2012010372 | 1/2012 |

* cited by examiner

US 9,360,061 B2

PRIME MOVER ARRANGEMENT COMPRISING A FLUID-ACTUATED CLUTCH ARRANGEMENT AND A FREEWHEEL

BACKGROUND OF THE INVENTION

The present invention relates to a prime mover arrangement comprising an internal combustion engine for driving a first shaft and comprising a steam engine, which is connected to the first shaft by means of a clutch arrangement, for driving a second shaft. Furthermore, a freewheel which interacts with the clutch arrangement is arranged between the first shaft and the second shaft in order to transmit a rotational movement of the second shaft to the first shaft in a first operating mode and to allow the first shaft to freewheel relative to the second shaft in a second operating mode.

The field of application of the present invention encompasses a drive technology of motor vehicles, in particular a drive technology which comprises an internal combustion engine and a steam engine for supporting the internal combustion engine.

When developing internal combustion engines, the reduction of fuel consumption is given a high priority. Internal combustion engines convert a portion of the chemical energy of the fuel into mechanical energy in order to drive motor vehicles. In so doing, a large portion of the chemical energy is released as waste heat which is dissipated in an unused state by means of the cooling system or in the exhaust gas of the internal combustion engine. In order to utilize this thermal energy, it is conceivable for the internal combustion engine to be coupled to a steam engine. The thermal energy from the internal combustion engine is thereby used to generate steam which expands in an expansion machine and thus provides further energy that can be used to drive the vehicle.

A combination of an internal combustion engine and a steam engine for utilizing waste heat is especially suited for use in a commercial vehicle. This is due to the fact that the internal combustion engine has to deliver here a large amount of power and therefore a large amount of thermal energy is available for generating steam.

The generally known prior art discloses a connection of the steam engine to the internal combustion engine via a rigid coupling. As a result, the combustion engine already carries the steam engine along from the start-up of said combustion engine although a sufficient amount of steam pressure is not present for the steam engine. The disadvantage that thereby arises is that the efficiency of the total system is reduced as a function of the friction of the steam engine, specifically when starting the internal combustion engine and as long as the generation of heat by the internal combustion engine is moderate.

The prior art further discloses that the steam engine and the internal combustion engine are connected to one another via an intermediary freewheel. As a result, the internal combustion engine can freely rotate if an insufficient amount of steam pressure is available to the steam engine. In this case, the internal combustion engine therefore does not have to overcome the additional frictional power of the steam engine. The disadvantage of this solution is that the internal combustion engine no longer carries the steam engine along, whereby, in an unfavorable standstill position of the steam engine, said steam engine can possibly no longer start up by itself.

The German patent application DE 10 2010 031 498 A1 discloses an electromagnetic, shiftable clutch which connects a steam engine to an internal combustion engine. In this case, a first shaft can be driven by the steam engine and a second shaft can be driven by the internal combustion engine. In addition, an intermediate wheel is connected to the first shaft and a clutch bell is connected at least indirectly to the second shaft, wherein a freewheel is disposed between the intermediate wheel and the clutch bell. The freewheel performs the task of transmitting the rotational movement of the intermediate wheel connected to the first shaft to the clutch bell and furthermore of allowing the clutch bell to move freely relative to the intermediate wheel. A frictional force or a form fit can at least indirectly be generated between the intermediate wheel and the clutch bell by means of an electromagnetic actuating force which is released by actuating an electromagnet by means of a controller.

SUMMARY OF THE INVENTION

On the basis of the previously mentioned prior art, it is the aim of the present invention to provide a prime mover arrangement comprising an internal combustion engine and a steam engine connected to the internal combustion engine via a freewheel, wherein a start-up of the steam engine is supported by the rotational movement generated by the internal combustion engine.

The aim is met on the basis of a prime mover arrangement according to the invention.

According to the invention, a clutch arrangement is designed as a fluid-actuated clutch arrangement that can be operated with positive or negative pressure and bridges the freewheel in a friction-fitted or form-fitted manner in order to transmit the rotational movement of the internal combustion engine to the second shaft via a flange arranged on the first shaft.

The hydraulic or pneumatic actuation of the clutch arrangement facilitates a reliable and simple actuating option. A bridging of the freewheel is particularly advantageous because the internal combustion engine can start up without the added resistance provided by the steam engine; and as soon as sufficient steam is available for operating the steam engine, the fluid-actuated clutch arrangement is closed and the steam engine is tow-started by the internal combustion engine. This action increases the efficiency of the system and results in a higher engine performance at a reduced fuel consumption.

A freewheel carrier which can be mounted to the second shaft is preferably fastened to an end face of a shaft shoulder of the second shaft by means for the axial and rotatory fixation thereof; thus enabling the rotational movement of the second shaft to be transmitted to the freewheel carrier. Such means can preferably consist of screws or pins. It is however also conceivable to introduce a groove into the second shaft in order to secure the freewheel carrier from twisting on said second shaft. The freewheel carrier is preferably secured axially by means of a shaft ring and/or a shaft nut.

In addition, an inner periphery of the freewheel is disposed on an outer periphery of the freewheel carrier that is designed as an annular surface and an outer periphery of the freewheel is disposed on an inner periphery of the flange that is designed as an annular surface. In a first operating mode, such an arrangement allows a rotational movement of the second shaft to be transmitted to the first shaft and, in a second operating mode, allows the first shaft to freewheel relative to the second shaft.

When the rotational movement of the second shaft is transmitted to the first shaft, a positive transmission of the torque of the second shaft occurs, so that the first shaft and thus the internal combustion engine are unloaded. The fuel economy is therefore due to the unloading of the internal combustion engine by the steam engine, wherein the steam engine converts the heat which would otherwise be released to the surrounding environment into mechanical energy.

The invention furthermore proposes that the flange arranged on the first shaft comprises, on an outer periphery thereof, a clutch lining that extends over said outer periphery and can be moved axially on said outer periphery of the flange. The clutch lining has an embossment which is formed in the direction of a shaft axis and extends parallel to an end face of the flange and does not abut against the flange. In addition, the freewheel carrier comprises a frictional surface which is configured parallel to the end face of the flange and is arranged between the end face of the flange and the embossment of the clutch lining.

A section of the freewheel carrier is located between the flange and the clutch lining disposed on the flange, wherein there is no contact between the flange and the freewheel carrier nor is there contact between the clutch lining and the freewheel carrier. The clutch lining is intermeshed with the flange such that an axial movement of the clutch lining is possible; however a radial movement is excluded.

According to a measure which further improves the invention, it is proposed that a clutch piston is disposed in a housing of the steam engine at the height of the embossment of the clutch lining.

The clutch piston preferably comprises an annular piston that acts on a thrust ring. The annular piston preferably consists of a relatively soft material and is provided with sealing lips and a sufficient amount of play in the housing in order to ensure that the annular piston does not seize or tilt in the housing during an axial movement of said piston.

In addition, the thrust ring comprises a roller bearing in a recess that extends radially. The roller bearing has a wear reducing effect when making contact with the embossment of the clutch lining. This results from the fact that, when the roller bearing makes contact with the rotating clutch lining, the roller elements in the roller bearing are set into motion and the thrust ring therefore does not rub against the embossment of the clutch lining.

According to the invention, a channel disposed on the annular piston carries a fluid, wherein the annular piston is moved axially when pressure is applied to the fluid and the embossment of the clutch lining thereby presses against the frictional surface of the freewheel carrier in order to achieve contact between said frictional surface of the freewheel carrier and the clutch lining.

The sealing lips seal the annular piston in the housing and create a control chamber into which the fluid can flow. As soon as the fluid fills the control chamber, the annular piston moves in the direction of the clutch lining and presses the embossment of the clutch lining against the frictional surface of the freewheel carrier. This friction-fitted connection enables the rotational movement of the first shaft to be transmitted to the second shaft and the steam engine to be tow-started by the internal combustion engine.

Further measures for improving the invention are depicted below in detail with the aid of drawings and in conjunction with the description of the preferred exemplary embodiments.

DETAILED DESCRIPTION

Figure 1:
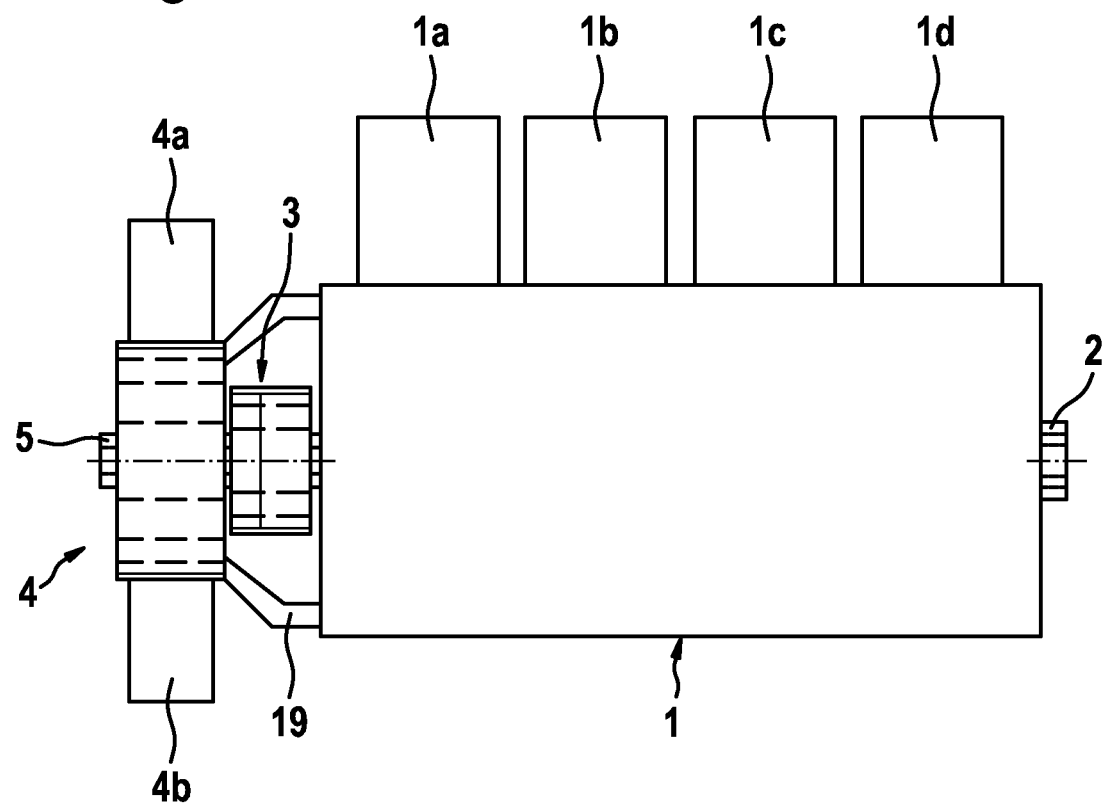
FIG. 1 shows a schematic cross sectional depiction of a prime mover arrangement comprising an internal combustion engine and a steam engine which are connected to one another via fluid-actuated clutch arrangement.

FIG. 1 shows a prime mover arrangement comprising an internal combustion engine 1 and a steam engine 4 which are connected to one another via a fluid-actuated clutch arrangement 3. The fluid-actuated clutch arrangement 3 is mounted between the steam engine 4 and the internal combustion engine 1. The internal combustion engine 1 has four cylinders 1a, 1b, 1c, 1d. Furthermore, the steam engine 4 has two opposing cylinders 4a, 4b. The cylinders 4a, 4b of the steam engine 4 act on a second shaft 5 which can be driven by the steam engine 4. The cylinders 1a to 1d act on a first shaft 2 which can be driven by the internal combustion engine 1. Because the fluid-actuated clutch arrangement 3 comprises the first shaft 2 and the second shaft 5, a compact configuration of the prime mover arrangement results. Furthermore, holding arms 19 are provided which connect a housing of the steam engine 4 to an engine block of the internal combustion engine 1.

Figure 2:
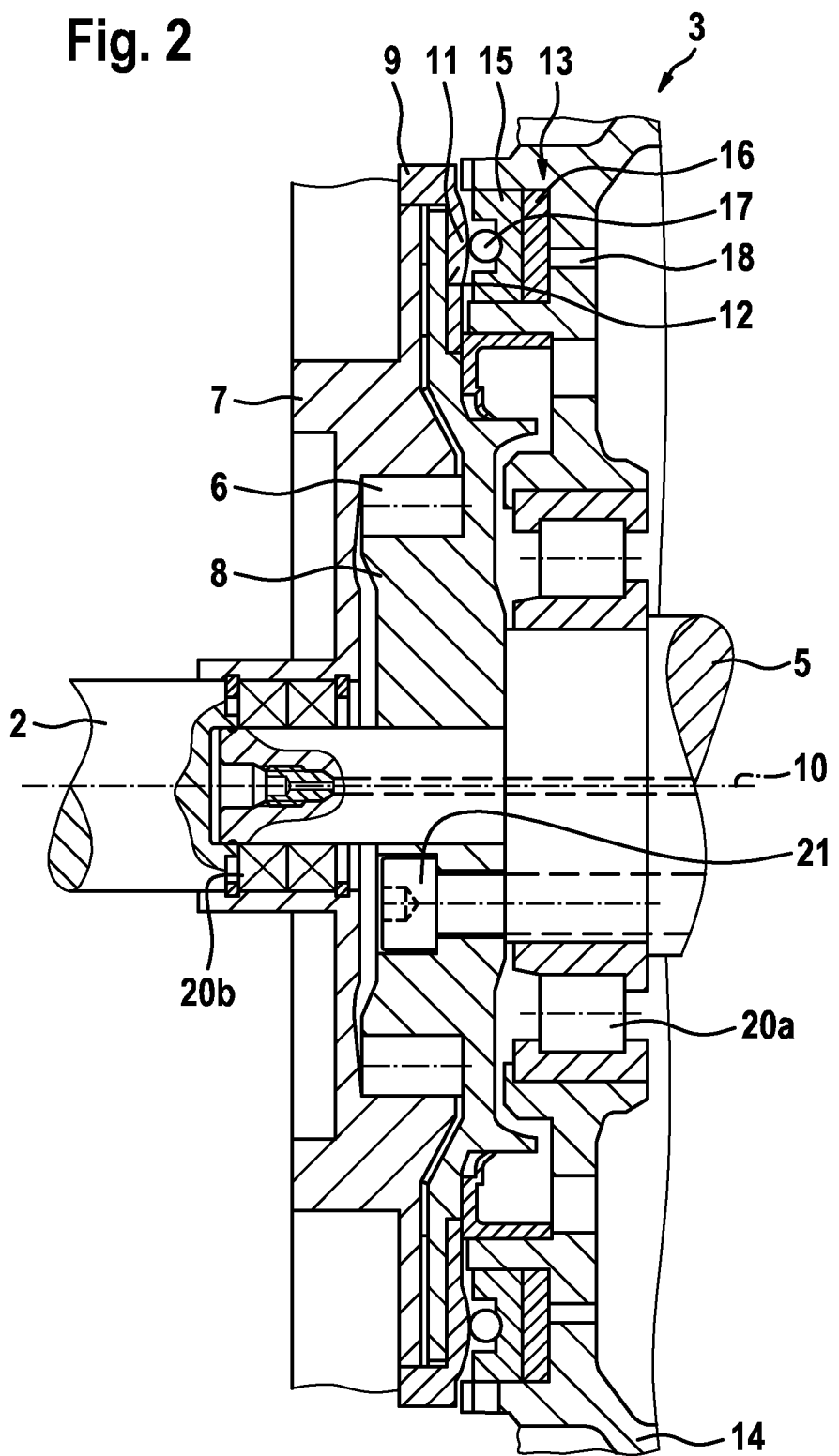
FIG. 2 shows an enlarged schematic cross sectional depiction of the fluid-actuated clutch arrangement depicted in FIG. 1 according to a first exemplary embodiment.

FIG. 2 is an enlarged depiction of the clutch arrangement 3. A freewheel carrier 8 which can be mounted to the second shaft 5 is fastened with screws 21 to an end face of a shaft shoulder of the second shaft 5; thus enabling the rotational movement of the second shaft 5 to be transmitted to the freewheel carrier 8. The second shaft 5 is mounted by means of a bearing 20a on a housing 14 of the steam engine 4. In addition, a flange 7 on the combustion engine side is mounted via a bearing 20b on the second shaft 5. An inner periphery of the freewheel 6 is disposed on an outer periphery of the freewheel carrier 8 that is designed as an annular surface; and an outer periphery of the freewheel 6 is disposed on an inner periphery of the flange 7 that is designed as an annular surface. The flange 7 arranged on the first shaft 2 comprises, on an outer periphery thereof, a clutch lining 9 that extends over said outer periphery and can be moved axially on said outer periphery of the flange 7. The clutch lining has an embossment 11 which is formed in the direction of a shaft axis 10 and extends parallel to an end face of the flange 7. The freewheel carrier 8 has a frictional surface 12 which is configured parallel to an end face of the flange 7 and is arranged between the end face of the flange 7 and the embossment 11 of the clutch lining 9. A clutch piston 13 is disposed in a housing 14 of the steam engine 4 at the height of the embossment 11 of the clutch lining 9, wherein the clutch piston 13 comprises an annular piston 16 which acts on a thrust ring 15 and a roller bearing 17 is disposed in a recess of the thrust ring 15 that extends in the radial direction. A channel 18 disposed on the annular piston 16 carries a fluid, wherein the annular piston 16 is moved axially when pressure is applied to the fluid, and the embossment 11 of the clutch lining 9 thereby presses against the frictional surface 12 of the freewheel carrier 8 in order to achieve contact between said frictional surface 12 of the freewheel carrier 8 and the clutch lining 9.

During normal operation of the steam engine 4, the freewheel 6 is locked on the internal combustion engine 1, and the torque of the steam engine 4 is transmitted to the first shaft 2. During start-up of the internal combustion engine 1, the freewheel 6 is active because steam is still not available in a sufficient quality. The internal combustion engine 1 can start without the steam engine 4 having to be tow-started in the process. As soon as steam is sufficiently available, the clutch piston 13 is subjected to pressure by means of the fluid and presses the clutch lining 9 against the freewheel carrier 8. As a result of the friction fit between the clutch lining 9 and the freewheel carrier 8, torque is transmitted from the flange 7 via the clutch lining 9 to the freewheel carrier 8 which is fixedly bolted to the second shaft 5; and the steam engine is tow-started. Pressure is no longer applied to the clutch piston 13 as soon as the steam engine runs on its own and transmits a torque to the internal combustion engine 1 via the freewheel 6 which is now locked.

The invention is not limited to the previously described preferred exemplary embodiment. Modifications to said embodiment are in fact conceivable which are included within the scope of protection of the subsequent claims. Hence, it is also, for example, possible to arrange the steam engine 4 on the side of the combustion engine 1 and to connect up a transmission via toothed belts and gear wheels. In addition, an operation with negative pressure is possible by means of a slight reconfiguration of the embodiment depicted in FIG. 2; thus enabling the clutch lining 9 to come into abutment at the freewheel carrier 8 when the clutch piston pulls instead of presses. Moreover, the frictional surface 12 of the freewheel carrier 8 and the frictional surface of the embossment 11 directed towards the freewheel carrier 8 can be structured in such a way that a form fit is achieved when the two surfaces come in contact.

In addition, it should be noted that "comprising" does not exclude other elements or steps and "one" does not exclude a plurality. It should furthermore be noted that features or steps which have been described with reference to one of the exemplary embodiments mentioned above can also be used in combination with other features or steps of other exemplary embodiments described above. Reference signs in the claims are not to be considered as limiting factors.

The invention claimed is:

1. A prime mover arrangement comprising an internal combustion engine (1) for driving a first shaft (2) and comprising a steam engine (4), which is connected to the first shaft by means of a clutch arrangement (3), for driving a second shaft (5), wherein a freewheel (6) which interacts with the clutch arrangement (3) is furthermore arranged between the first shaft (2) and the second shaft (5) in order to transmit a rotational movement of the second shaft (5) to the first shaft (2) in a first operating mode and to allow the first shaft (2) to freewheel relative to the second shaft (5) in a second operating mode, characterized in that the clutch arrangement (3) is a fluid-actuated clutch arrangement (3) which is configured to be operated with positive pressure or negative pressure, wherein said clutch arrangement (3) bridges the freewheel (6) in a friction-fitted or form-fitted manner in order to transmit the rotational movement of the internal combustion engine (1) to the second shaft (5) via a flange (7) arranged on the first shaft (2), wherein the flange comprises, on an outer periphery thereof, a clutch lining (9) which extends across said outer periphery and is configured to be moved axially on said outer periphery of the flange (7) and which has an embossment (11) that is formed in a direction of a shaft axis (10) and extends parallel to an end face of the flange (7) and does not abut against said flange (7), and wherein a freewheel carrier (8) mounted on the second shaft (5) has a frictional surface (12) which is configured parallel to the end face of the flange (7) and is disposed between said end face of the flange (7) and the embossment (11) of the clutch lining (9).

2. The prime mover arrangement according to claim 1, characterized in that the freewheel carrier (8) is fastened to an end face of a shaft shoulder of the second shaft (5) by means for the axial and rotatory fixation thereof, thus enabling the rotational movement of the second shaft (5) to be transmitted to the freewheel carrier (8).

3. The prime mover arrangement according to claim 2, characterized in that an inner periphery of the freewheel (6) is disposed on an outer periphery of the freewheel carrier (8) which is an annular surface and an outer periphery of the freewheel (6) is disposed on an inner periphery of the flange (7) which is an annular surface.

4. The prime mover arrangement according to claim 3, characterized in that a clutch piston (13) is disposed in a housing (14) of the steam engine (4) at a height of the embossment (11) of the clutch lining (9).

5. The prime mover arrangement according to claim 4, characterized in that the clutch piston (13) comprises an annular piston (16) which acts on a thrust ring (15).

6. The prime mover arrangement according to claim 5, characterized in that the thrust ring (15) has a roller bearing (17) in a recess that extends radially.

7. The prime mover arrangement according to claim 6, characterized in that a channel (18) disposed on the annular piston (16) carries a fluid, wherein the annular piston (16) is moved axially when pressure is applied to the fluid and, as a result, the embossment (11) of the clutch lining (9) presses against the frictional surface (12) of the freewheel carrier (8) in order for contact to be made between the frictional surface (12) of the freewheel carrier (8) and the clutch lining (9).

8. The prime mover arrangement according to claim 1, characterized in that a clutch piston (13) is disposed in a housing (14) of the steam engine (4) at a height of the embossment (11) of the clutch lining (9).

9. The prime mover arrangement according to claim 8, characterized in that the clutch piston (13) comprises an annular piston (16) which acts on a thrust ring (15).

10. The prime mover arrangement according to claim 9, characterized in that the thrust ring (15) has a roller bearing (17) in a recess that extends radially.

11. The prime mover arrangement according to claim 9, characterized in that a channel (18) disposed on the annular piston (16) carries a fluid, wherein the annular piston (16) is moved axially when pressure is applied to the fluid and, as a result, the embossment (11) of the clutch lining (9) presses against the frictional surface (12) of the freewheel carrier (8) in order for contact to be made between the frictional surface (12) of the freewheel carrier (8) and the clutch lining (9).

* * * * *